Sept. 24, 1963  R. H. IMMEL  3,104,424
PRESSURE POT EXPANDABLE POLYSTYRENE MOLD FILLING DEVICE
Filed Aug. 22, 1961
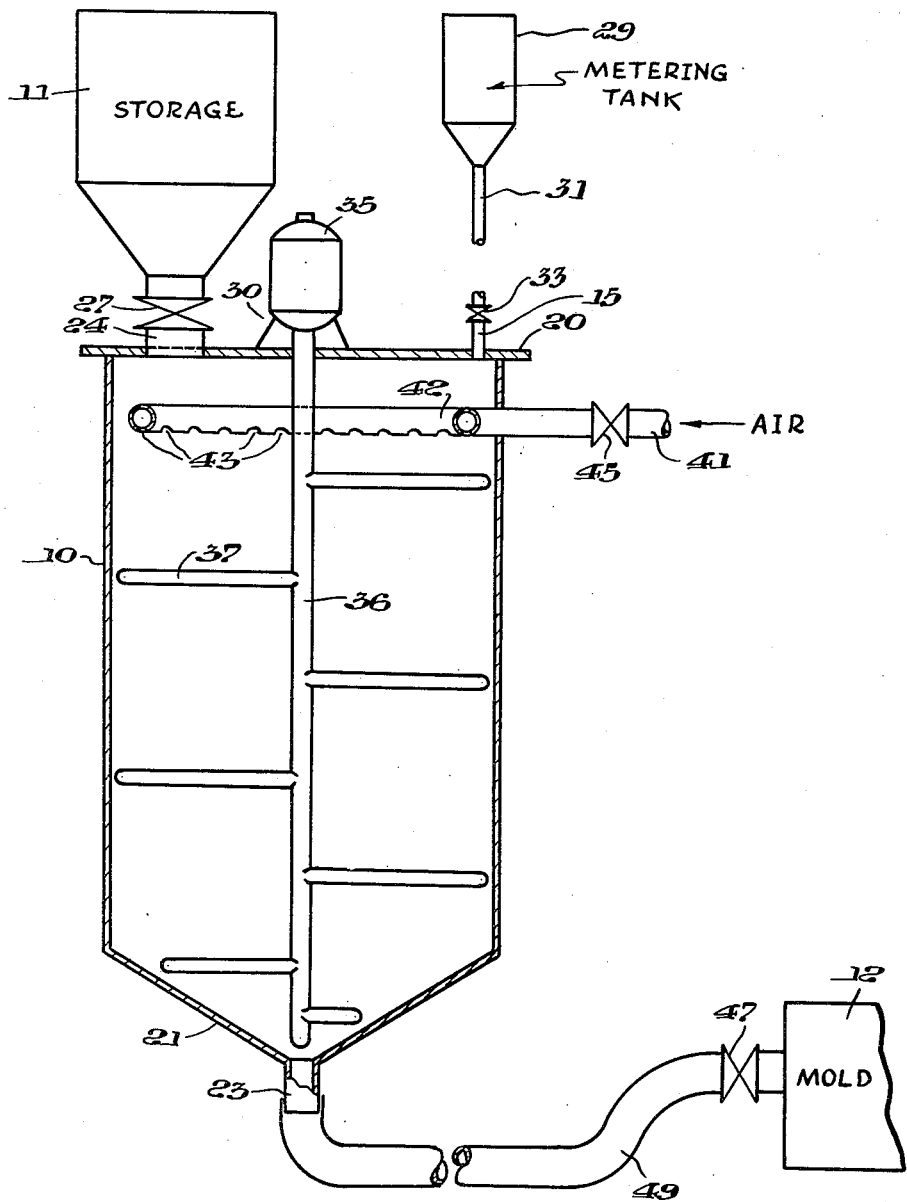
INVENTOR.
RICHARD H. IMMEL
BY
Oscar B. Brumback
his ATTORNEY United States Patent Office 3,104,424
Patented Sept. 24, 1963

3,104,424
PRESSURE POT EXPANDABLE POLYSTYRENE
MOLD FILLING DEVICE
Richard H. Immel, Sewickley, Pa., assignor to Koppers Company, Inc., a corporation of Delaware
Filed Aug. 22, 1961, Ser. No. 133,245
1 Claim. (Cl. 18—30)

This invention relates generally to the production of foamed polymeric structures and, more particularly, to apparatus for feeding expandable polymeric particles to molds that are to be heated with radio frequency energy.

Articles such as floats, toys, novelties, and insulation are desirably made from expandable polymeric materials to impart to the articles integral low density, cellular, or foamed polymeric structure. Expandable polymeric particles that will produce such structures, when the particles are heated under confinement in a mold, are commercially available; for example, expandable polystyrene is sold under the tradename "Dylite." Expandable polymers can conveniently be made in accordance with the process described in D'Alelio U.S. Patent No. 2,983,692.

The heat can be supplied to the expandable polymeric particles dielectrically by way of a high frequency alternating electrical field. The high frequency waves transfer energy to the expandable particles so that electrical energy is immediately converted to thermal energy. The heat resulting from such energy causes an almost instantaneous expansion of the polymeric material to produce an integral cellular low-density structure having small uniform voids. However, polystyrene and related expandable polymeric materials approach in varying degrees the ideal dielectric and so are virtually transparent to the power applied to them by high frequency waves so that such particles cannot without further treatment be heated to their melting point in a high frequency field. Copending application, Serial No. 705,540, filed December 27, 1957, by E. A. Edberg and R. H. Immel and now Patent No. 2,998,501, describes how such polymeric particles may be rendered suitable for dielectric heating by covering the particles with a high power loss factor material. To do this, water is combined with a minor portion of a wetting or coating agent that promotes uniform covering of the expandable polymeric material by the water molecules, suitable wetting or coating agents being described in the aforementioned application to which reference is made for a fuller description of the details.

Expandable polymeric particles that have been wetted so as to be used with radio frequency molding techniques presented a problem in the filling of the molds. Molds have been filled heretofore by the so-called "blow filling" technique, wherein compressed air through a Venturi aspirates the beads into the mold. This type of apparatus did not work satisfactorily with the wetted expandable polymer particles. The wetted beads did not feed well into the suction end of the "blow filler," the high volume of air tended to dry the wetted expandable polystyrene thereby losing the advantage of using the wetted material giving a variation in the moisture content of the wetted particles. Some particles tend to dry more than others. Moisture control is, of course, critical in molding processes utilizing high frequency waves. Such varying conditions have not been readily controllable and have made it virtually impossible to control the quality of the product. Unequally wetted particles, for example, gave a molded product which was poorly fused.

An object of this invention, therefore, is to provide a novel apparatus for coating particles of expandable polymer with water so that the particles will react to radio frequency waves and for feeding a mold with wetted particles.

This invention contemplates a novel vessel whose upper portion has an inlet for receiving expandable polymeric particles, an inlet for receiving controlled amounts of high power loss factor material for wetting the particles, and a distributed air supply for supplying pressure on the beads so as to force the beads through an outlet at the lower portion of the vessel, and an agitator for agitating the particles, whereby the particles are uniformly coated with the wetting agent and are flowed evenly under air pressure from the vessel to the mold.

The above and other objects and novel features of this invention will appear more fully from the detailed description when the same is read in conjunction with the accompanying drawing. It is to be expressly understood, however, that the drawing is not intended to be a definition of the invention, but is for the purpose of illustration only.

The single sheet of drawing illustrates partially in cross-section an embodiment of the invention.

The embodiment of the invention, as illustrated in the drawing, generally is a vessel 10 connected between a storage 11 for the polymer particles and a mold 12 in which the particles are heated in a high frequency field.

Vessel 10 may be of generally cylindrical shape with a plate 20 at the upper portion as a closure and with a frustroconical lower portion 21 leading to outlet 23. A conduit 24 connects storage 11 with plate 20 for the feed of expandable polymeric particles to vessel 10. The flow of polymeric particles from storage 11 is controlled by a conventional valve 27 in conduit 24. Plate 20 also has an inlet 15 which is connected to a metering tank 29 by way of conduit 31 and valve 33. This supplies controlled amounts of a wetting agent from tank 29 to vessel 10.

A conventional motor and drive 35 also mounted on plate 23 drives an agitator 30. This agitator comprises a shaft 36 having a series of arms 37 projecting from the shaft.

Air from a suitable source of supply is fed by way of conduit 41 to a distributor ring 42, which is generally circular in shape and which extends around the inner portion of the vessel 10 at the upper end thereof. Apertures 43 in the distributor ring permit air to be supplied and distributed throughout the periphery of vessel 10. The air flow is controlled by valve 45.

To operate the foregoing apparatus, valve 27 is opened, permitting dry expandable polymeric particles to flow from storage 11 to vessel 10. As soon as the vessel is filled, valve 27 is closed and agitator drive 35 is actuated whereby shaft 36 and arms 37 commence the agitation of the beads in vessel 10. Thereafter, valve 33 is opened to flow a measured quantity of additive solution from metering tank 29 into vessel 10. Valve 33 is then closed and valve 45 of air line 41 opened so that air will flow through conduit 41 and distributing ring 43 into vessel 10 to place the vessel under pressure. Thereafter, valve 47 in conduit 49 is opened whereby air and polymeric particles will flow from vessel 10 through conduit 49 into mold 12. As soon as the mold is filled, valve 47 is closed and mold 12 removed for heating in the high frequency field.

The operation of the agitator 30 at the same time that air is being distributed through distributor ring 42 seems to have a significant effect. If agitator 35 be stopped, air from the openings 43 in distributor ring 42 soon drill holes through the expandable polymeric particles in vessel 10 whereupon air flows through conduit 49 without delivering the polymeric particles. If agitator 35 be placed in operation and air not be added by way of line 41, the wetted particles soon bridge and clog opening 53 at the lower end of vessel 10. This bridging then prevents further passage of particles through conduit 49.

The foregoing has presented a novel apparatus for mixing a high power loss factor material onto beads of expandable styrene polymers and for flowing the wetted beads into a mold, whereby the beads are fed to the mold rapidly and in a condition for uniformly receiving high frequency energy from radio frequency waves.

What is claimed:

Apparatus for rendering polymeric particles that are expandable under the influence of heat, but that are transparent to a high frequency dielectric field capable of being heated by said field comprising a storage for said particles, a generally cylindrical vertical vessel, a closure for the upper end of said vessel, a first aperture in said closure for receiving said particles from said storage, a second aperture in said closure for receiving an agent for the coating of said particles, an agitator mounted on said closure including a shaft extending into and longitudinally of said vessel and having arms projecting laterally therefrom for agitating said particles, a generally circular air distributor mounted within said vessel subadjacent said closure so as to extend around the inner portion of said vessel and having a plurality of apertures therein for distributing air under pressure into said vessel, a mold for receiving said particles and subjecting them to a high frequency dielectric field, and said vessel having a generally frustroconical bottom terminating in an opening for flowing said air and said particles to said mold as particles that are coated with said agent and responsive to said field.

References Cited in the file of this patent

UNITED STATES PATENTS

| | | |
|---|---|---|
| 1,215,560 | Leake | Feb. 13, 1917 |
| 1,242,120 | Andrews | Oct. 9, 1917 |
| 1,559,666 | Bernier | Nov. 3, 1925 |
| 2,450,436 | McIntire | Oct. 5, 1948 |
| 2,608,393 | Hale | Aug. 26, 1952 |
| 2,764,565 | Hoppe et al. | Sept. 25, 1956 |
| 2,869,214 | Van Buren | Jan. 20, 1959 |
| 2,942,860 | Ridley et al. | June 28, 1960 |
| 2,951,260 | Harrison et al. | Sept. 6, 1960 |
| 2,998,501 | Edberg et al. | Aug. 29, 1961 |